May 5, 1959  J. C. KARCHER ET AL  2,885,270
SYSTEM FOR RECOVERING URANIUM FROM ITS ORES
Filed Jan. 25, 1954
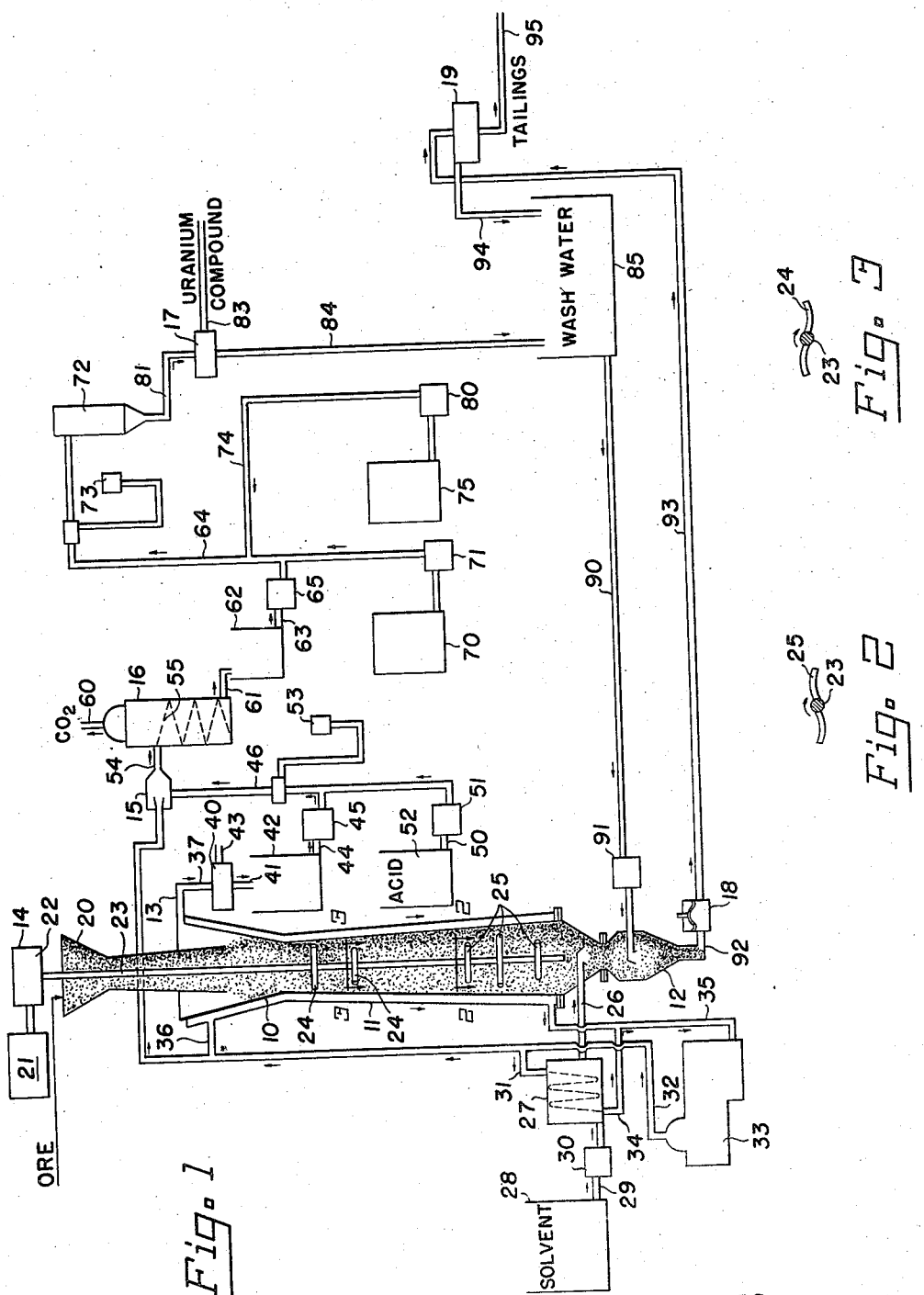
JOHN CLARENCE KARCHER
FORREST J. ALLEN, JR.

2,885,270
SYSTEM FOR RECOVERING URANIUM FROM ITS ORES

John Clarence Karcher and Forrest J. Allen, Jr., Dallas, Tex., assignors to Concho Petroleum Company, Dallas, Tex., a corporation of Delaware Application January 25, 1954, Serial No. 405,862

6 Claims. (Cl. 23—260)

This invention relates to the treatment of uranium bearing ores and relates more particularly to a system for removing and recovering uranium values from uranium bearing ores.

The concentration of uranium in uranium bearing ores is quite low. For example, uranium bearing ores may contain but 0.1 to 0.5 percent by weight of uranium yet will be regarded as being particularly rich with respect to uranium values. For this reason, in order to make the working of a uranium ore deposit economically feasible, it is essential that maximum recovery of uranium values be obtained.

It is an object of this invention to provide a system for removing and recovering uranium from its ores. It is another object of this invention to reduce the cost of removing and recovering uranium from its ores. It is another object of this invention to increase the recovery of uranium from its ores. These and further objects of the invention will become apparent from the following detailed description thereof.

Broadly, in accordance with the invention, a system is provided for subjecting uranium bearing ore to countercurrent extraction at elevated temperatures with an aqueous solution of sodium bicarbonate in an extraction zone, removing the extract from the extraction zone, acidifying the extract, removing carbon dioxide from the acidified extract, alkalizing the extract to precipitate uranium therefrom, separating the precipitated uranium from the resulting solution, removing tailings from the extraction zone by forming a slurry thereof with wash water, separating the tailings from the slurry and recovering the liquid portion thereof, and recycling this liquid along with the solution from which the precipitated uranium was separated to the extraction zone as wash water for removing tailings therefrom.

With this system, economical and efficient removal and recovery of uranium values from the ore is effected. Counter-current extraction of the ore with sodium bicarbonate solution at elevated temperatures results in maximum removal of uranium values. Removal of carbon dioxide from the acidified extract and alkalizing of the acidified extract after removal of the carbon dioxide permits precipitation and recovery of maximum quantities of the uranium. The removal of the tailings from the extraction zone in the form of a slurry is economical and effective and the recycle of the liquid removed from the slurry along with the solution separated from the precipitated uranium reduces the cost of handling the tailings to a minimum.

Figure 1 is a flow sheet schematically illustrating a system for treating a uranium bearing ore in accordance with the invention.

Figure 2 is a view taken along the line 2—2 of Figure 1.
Figure 3 is a view taken along the line 3—3 of Figure 1.

Referring now to the drawings, the system includes an extraction tower 10 provided with a jacket 11, a tailings receiver 12, an overflow weir 13, and stirring means 14. Means are provided to admix acid with the fluid leaving the weir 13. A nozzle chamber 15 is provided wherein steam is admixed with the acidified fluid and the nozzle chamber is connected by fluid conveying means with gas-liquid separator 16. Means are provided for alkalizing the solution after leaving the gas-liquid separator and in filter 17 the precipitated uranium is recovered from the mother liquor. Means are provided to pass the mother liquor to the tailings receiver for the purpose of forming a slurry with the tailings. A pump 18 pumps the slurry from the tailings receiver to a thickener 19 and means are provided to admix the liquid separated from the tailings in the thickener 19 with the mother liquor recycled to the tailings receiver. While the system may be used in connection with various chemical procedures for extracting the ore and recovering the uranium from the extract, the system will be described in connection with a process wherein sodium bicarbonate solution, at an elevated temperature, is employed for extraction of the ore and the extract solution is treated with an acid to assist in removal of carbon dioxide and thereafter with an alkaline compound to precipitate uranium.

Hopper 20 is located above extraction tower 10. Stirring means 14 comprises motor 21, gear box 22, shaft 23, a plurality of stirring arms 24, and a plurality of stirring arms 25. The stirring arms 24 located near the upper portion of the tower are curved to present a concave surface in the direction of their travel and the stirring arms 25 located near the lower portion of the tower are curved to present a convex surface in the direction of their travel. The direction of travel of the shaft 23 is shown by the arrows in Figures 2 and 3.

Line 26 enters the tower at the bottom portion thereof and the other end of the line is connected to heat exchanger 27. Storage tank 28 is connected by means of line 29 containing pump 30 to the other side of heat exchanger 27. The heat exchanger is provided with a steam inlet line 31 connected to line 32 leading from boiler 33 and with condensate outlet line 34 connected to line 35. The line 35 is a condensate line leading between jacket 11 and boiler 33 and line 32 leads to nozzle chamber 15. Line 36 leads to jacket 11.

Line 37 leads to filter 40 and line 41 leads from filter 40 to surge tank 42. Line 43 leads from the filter 40 to a tailings pile. Line 44 provided with pump 45 leads to line 46. Line 50 contains pump 51 and leads between storage tank 52 and line 46 leading to nozzle chamber 15. The line 46 is also provided with pH meter 53 at the upstream side of line 44.

Line 54 leads from nozzle chamber 15 to gas liquid separator 16. The gas liquid separator is provided with a plurality of vanes 55, a gas outlet line 60 and a liquid outlet line 61 leading to surge tank 62. Line 63 leads from the surge tank to connect with line 64 and contains pump 65. The line 64 leads from storage tank 70 and contains pump 71 and is connected to settling tank 72. A pH meter 73 is provided in line 64 on the downstream side of settling tank 72. Line 74 leads from storage tank 75 to line 64 and contains pump 80. Line 81 provides an outlet line from settling tank 72 and leads to filter 17. Line 83 leads from the filter 17 to product storage.

Line 84 leads from filter 17 to storage tank 85 and line 90 leads from the storage tank to the tailings receiver 12. Pump 91 is provided in line 90. Line 92 leads from the tailings receiver to pump 18, line 93 leads from pump 18 to the thickener 19, and line 94 leads from the thickener to the storage tank 85. Line 95 leads to a tailings pile.

Uranium bearing ore is fed into the top of hopper 20 from which it falls by gravity into the extraction tower 10. The uranium bearing ore prior to feeding into the hopper 20 is crushed to a suitable particle size for easy movement through the tower 10. Conveniently, the ore may be wetcrushed and the liquid employed during the crushing may be aqueous sodium bicarbonate solution of the type employed for extraction of the ore. Where wet-crushing of the ore employing aqueous sodium bicarbonate solution is effected, dissolved uranium values may be conveniently recovered by passing the entire amount of the liquid along with the crushed ore to the tower 10. The uranium bearing ore descends downwardly through the tower by gravity and during its downward descent it is met by an upwardly moving stream of aqueous sodium bicarbonate solution at an elevated temperature which enters the tower through the line 26. As the ore moves downwardly and the aqueous sodium bicarbonate solution moves upwardly through the tower 10, stirring of the ore and the solution is effected by the stirring means 14. At the upper portion of the tower, the arms 24 rotating with their convex faces forward move the ore outwardly towards the wall of the tower with the result that the solution tends to move inwardly towards the center of the tower. At the lower portion of the tower, the arms 25 rotating with their concave faces forward move the ore inwardly towards the center of the tower with the result that the solution tends to move outwardly towards the wall of the tower. By this stirring, channeling of the ore is prevented and a uniform distribution of the upwardly flowing solution in the tower is obtained. Effective stirring may be obtained with one rotation of the arms every five to sixty minutes. The number of arms per unit height of tower may be varied but effective results are obtained with one arm per foot of tower height and it is preferred to stagger the arms radially on the shaft 23.

Sodium bicarbonate dissolved in water, the extracting solvent for the downwardly moving ore in the tower 10, is removed from storage tank 28 through the line 29 and is pumped by means of the pump 30 through the heat exchanger 27. In heat exchanger 27 the solution is heated by indirect heat exchange with steam. Thereafter, the solution is passed to the tower 10 through the line 26.

Steam for heating of the solution in heat exchanger 27 is provided by the boiler 33 and the steam leaves therefrom through the line 32 and enters the heat exchanger through the line 31. Steam from the boiler 33 also enters the jacket 11 of the tower 10 through the line 36 to maintain the sodium bicarbonate solution passing upwardly through the tower at a desired temperature. Condensate leaves the jacket 11 through the line 35 and is recycled therethrough to the boiler 33. Condensate leaves the heat exchanger through the line 34 and is recycled to the boiler through line 34 and line 35.

The sodium bicarbonate solution passing upwardly through the tower 10 is at an elevated temperature. This temperature must be at least 90° F. However, temperatures higher than 90° F. are preferred and temperatures of about 180° F. are most effective. Higher temperatures may be employed if desired. The tower 10 may be operated at atmospheric pressure and, by providing a suitable closure at the top portion thereof, may be operated at super atmospheric pressure. When employing the latter pressures, the temperature of the sodium bicarbonate solution may be above the boiling point of the solution at atmospheric pressures. However, temperatures at which decomposition of the sodium bicarbonate will occur should not, of course, be used. Preferably, the sodium bicarbonate solution is heated in the heat exchanger 27 to the desired temperature for extraction of the ore and the solution is maintained at this temperature by providing steam to the jacket 11.

The sodium bicarbonate solution containing the dissolved uranium values removed from the ore leaves the tower 10 at the top portion thereof through the weir 13 and the line 37 and passes to the filter 40. The tower 10 flares outwardly at the top portion thereof whereby the upward velocity of the sodium bicarbonate solution progressively decreases as it approaches the top of the tower and entrainment of ore is minimized. In filter 40, any ore which may be entrained with the solution is removed. The separated ore is carried through the line 43 to a tailings pile and the solution passes from the filter through the line 41 to the surge tank 42.

The solution in surge tank 42 is pumped therefrom through line 44 by means of the pump 45 to the line 46 and through the line 46 to the nozzle chamber 15. An aqueous acid solution such as an aqueous sulfuric acid solution is pumped from the storage tank 52 by means of the pump 51 and thence through the line 46 to be admixed with the sodium bicarbonate solution containing the dissolved uranium passing through this line. The quantity of the acid solution admixed with the sodium bicarbonate solution containing the dissolved uranium is such that the pH of the resulting mixed solution is between about 2.0 and 6.5 depending upon the reagents used for subsequent precipitation of the uranium values. The pump 51 may be a proportioning pump and by suitable operative connections (not shown) may provide a desired volume of acid solution for each volume of solution pumped by pump 45. The pH meter 53 in line 46 may be used to measure or record the pH of the solution in the line.

At a pH between about 2.0 and 6.5, the sodium bicarbonate in the solution is decomposed with the formation of carbon dioxide gas and this gas accompanies the solution into the nozzle chamber 15 both as free gas and as dissolved gas. A stream of high velocity steam enters the nozzle chamber through the line 32 and admixes with the solution entering the chamber through the line 46. Line 32 terminates within the nozzle chamber in a nozzle or plurality of nozzles whereby the steam contacts the solution at a velocity tending to atomize the solution and inject it through line 54 into the gas-liquid separator in a highly dispersed state. Sufficient steam is employed such that the solution in the nozzle chamber is heated to the boiling temperature, and the heated solution, which should be at least 212° F. at normal atmospheric conditions of pressure, enters the separator. As a result of the agitation, dispersion, and heating of the solution by admixture with the high velocity steam, substantially all of the carbon dioxide gas formed by reaction of the sodium bicarbonate and the acid is released from solution in the separator 16. The solution trickles downwardly over the vanes 55 and leaves the separator through the line 61. The carbon dioxide gas, and any excess steam, travels upwardly and leaves the separator through the line 60. The solution containing the desired uranium values leaving the separator 16 through the line 61 enters the surge tank 62. The solution is pumped from the surge tank through the line 63 by means of the pump 65 and passes through the line 64. In the line 64, the solution may be admixed, if satisfactory removal of carbon dioxide from the solution was not effected in gas-liquid separator 16, with a solution of calcium chloride pumped from the storage tank 70 through the line 64 by means of pump 71. The amount of calcium chloride solution admixed with the uranium-containing solution should be at least sufficient to react with all of any carbon dioxide contained in the solution. The pump 71 may be a proportioning pump and by suitable operative connections (not shown) may provide a desired volume of calcium chloride solution for each volume of solution pumped by pump 65.

The uranium-containing solution in the line 64 is alkalized to precipitate the uranium values. For this purpose, there is added through the line 74 to the solution in the line 64 a suitable alkalizing solution. The alkalizing solution is pumped from the storage tank 75 through the line 74 by means of the pump 80 and sufficient amounts of this solution are admixed with the uranium-containing solution to bring the pH of the resulting mixture to a pH between about 7.5 and 8.5. At these values of the pH, the uranium precipitates from the solution. The pump 80 may be a proportioning pump and by suitable operative connections (not shown) may provide a desired volume of alkaline solution for each volume of solution pumped by pump 65. The pH of the alkalized solution in line 64 may be recorded or measured by the pH meter 73.

The alkaline solution admixed with the uranium-containing solution to precipitate the uranium is preferably sodium hydroxide and the uranium will be precipitated as sodium uranate. Potassium hydroxide may also be employed, if desired, and potassium hydroxide will precipitate the uranium as potassium uranate. Where sodium hydroxide or potassium hydroxide is used, it is preferred that the pH of the unanium-containing solution before addition of the hydroxide be between about 2.0 and 4.0. In this case, therefore, the amount of acid solution admixed with the uranium-containing solution pumped from surge tank 42 should be such to bring the pH of the resulting mixture to a value within this range. Other types of alkaline solutions may also be used to precipitate the uranium. For example, sodium phosphate may be used and the uranium will be precipitated as uranyl phosphate. Where sodium phosphate is used, the solution is preferably a solution of monosodium orthophosphate and disodium orthophosphate in such proportions that the solution has a pH between about 4.0 and 4.5. Where sodium phosphate is used, it is preferred that the pH of the uranium-containing solution prior to addition of the sodium phosphate be between about 4.0 and 4.5 and, in this case, therefore, the amount of sulfuric acid solution admixed with the uranium-containing solution pumped from surge tank 42 may be less per unit volume of uranium-containing solution than the case where sodium or potassium hydroxide is used.

The flocculation of the precipitated uranium compound tends to be a slow process, particularly where sodium or potassium hydroxide is used as the alkalizing agent. Accordingly, the solution in line 64 is passed into settling tank 72 wherein the solution remains for a sufficient time to effect substantially complete flocculation of the precipitated uranium compound. The settling tank 72 is of sufficient volume that the residence time of the solution therein with continuous flow from line 64 is at least one hour. Preferably, however, the settling tank is of sufficient volume that the residence time is about six hours. The slurry of mother liquor and precipitated uranium compound is removed from the bottom of the settling tank through line 81 and is passed to the filter 17. In the filter 17 the precipitated uranium compound is removed from the mother liquor and recovered. The uranium compound thus recovered is a commercial product and is removed from the filter to product storage through the line 83.

The mother liquor from the filter 17 is passed through the line 84 to the wash water storage tank 85. For removal of the spent ore from the tower 10 wash water is pumped from the tank 85 through the line 90 which enters the tailings receiver 12. The wash water admixes with the ore in the tailings receiver to form a slurry with the ore and in the form of a slurry the ore is readily removable from the tailings receiver. The volume rate at which the wash water is pumped by the pump 91 to the tailings receiver is equal to the volume rate at which slurry is removed therefrom by the pump 18. Thus, downward flow into the tailings receiver of aqueous sodium bicarbonate solution from the line 26 and upward flow of wash water through the tower 10 are prevented. The amount of wash water required to form a slurry which is readily removable from the tailings receiver may be between 50 and 100 percent by weight of the ore, depending upon the fineness of grind and the density of the ore, the more finely ground and the less dense ores requiring less water than the more coarsely ground and denser ores.

The slurry of ore is pumped by the pump 18 through the line 92 and thence through the line 93 to the thickener 19. The slurry of ore may also be transferred from the tailings receiver 12 by other means such as an elevator inclined at an angle between the horizontal and the vertical. In the thickener 19 the ore is separated from the wash water and the ore is removed to a tailings pile. The wash water is removed from the thickener through line 94 and is passed to storage tank 85 to be reused for removal of further ore from the tailings receiver 12.

The pumps, tanks, filter, and thickener employed in carrying out the process may be of any suitable type. However, with respect to pumps 30, 45, 51, 65, 71, 80, and 91, it is preferred that they be of the positive displacement type. The pump 18 is a positive displacement pump of the diaphragm type. Various valves, controls, gauges, and similar apparatus useful in carrying out the process have not been described above in connection with the flow sheet of the system but provision of these may be readily made by those skilled in the art.

It will be seen from the above that we have provided a unitary and economical system for the separation and recovery of uranium values from uranium bearing ores. The reagents employed, namely, water, sodium bicarbonate, acid, calcium chloride when used, and the alkalizing agents, are of low cost and readily available. Extraction with the sodium bicarbonate solution at elevated temperatures will effect removal of 90 percent by weight of the uranium values from ores while extraction of the same ores with sodium bicarbonate solution at atmospheric temperatures will effect removal of none or at the most 50 percent by weight of the uranium values. Where extraction with sodium bicarbonate solution at atmospheric temperatures effects removal of 80 per cent of the uranium values from certain ores, we have found extraction at elevated temperatures effects removal of 95 percent of the uranium values. The increase in the extraction of the uranium values by employing the sodium bicarbonate solution at elevated temperatures is not due to increased solubility of uranium at the elevated temperatures. On the contrary, the effect is due to disintegration of the matrix of the ore by the sodium bicarbonate solution at elevated temperatures. Removal of spent ore from the extraction tower is effected without difficulty by forming a slurry of the ore, applying for this purpose as wash water the mother liquor from which the extracted uranium was precipitated. Further, recovery of the wash water after separation of the spent ore and recycle thereof is effected resulting in further economies.

Having thus described our invention, it will be understood that such description has been given by way of illustration and example and not by way of limitation, reference for the latter purpose being had to the appended claims.

We claim:
1. A system for the treatment of uranium bearing ore to remove and recover unanium values therefrom comprising an extraction tower, means located at the top of said tower for passing uranium bearing ore into said tower, a line entering the bottom of said tower for passing a heated solvent for uranium thereto, a tailings receiver at the bottom of said tower, a heating jacket surrounding said tower, an overflow weir for fluid located at the top of said tower, a nozzle chamber, a line for passing liquid from said overflow weir to said nozzle chamber, a first storage tank for acid, a line connected to said first storage tank for passing acid to liquid passing from said overflow weir to said nozzle chamber, a gas-liquid separator, a line connected between said nozzle chamber and said gas-liquid separator, settling tank, a line connected between said gas-liquid separator and said settling tank, a second storage tank for alkalizing solution, a line connected to said second storage tank for passing alkalizing solution to said settling tank, a filter for precipitated uranium compound, a line connected between said settling tank and said filter, a third storage tank, a line connected between said third storage tank and said filter, a line connected between said third stor- age tank and said tailings receiver, means for removing tailings from said tailings receiver, a separator for separating tailings and liquid, and a line connected between said separator and said third storage tank for passing liquid from the separator to said third storage tank.

2. A system for the treatment of uranium bearing ore to remove and recover uranium values therefrom comprising an extraction tower, a plurality of stirring arms positioned interiorly of said extraction tower, means located at the top of said tower for passing uranium bearing ore into said tower, a line entering the bottom of said tower for passing a heated solvent for uranium thereto, a tailings receiver at the bottom of said tower, a heating jacket surrounding said tower, an overflow weir for fluid located at the top of said tower, a nozzle chamber, a line for passing liquid from said overflow weir to said nozzle chamber, a first storage tank for acid, a line connected to said first storage tank for passing acid to liquid passing from said overflow weir to said nozzle chamber, a gas-liquid separator, a line connected between said nozzle chamber and said gas-liquid separator, a settling tank, a line conected between said gas-liquid separator and said settling tank, a second storage tank for alkalizing solution, a line connected to said second storage tank for passing alkalizing solution to said settling tank, a filter for precipitated uranium compound, a line connected between said settling tank and said filter, a third storage tank, a line connected between said third storage tank and said filter, a line connected between said third storage tank and said tailings receiver, means for removing tailings from said tailings receiver, a separator for separating tailings and liquid, and a line connected between said separator and said third storage tank for passing liquid from the separator to said third storage tank.

3. A system for the treatment of uranium bearing ore to remove and recover uranium values therefrom comprising an extraction tower, a plurality of stirring arms positioned interiorly of said extraction tower, means for rotating said stirring arms, means located at the top of said tower for passing uranium bearing ore into said tower, a line entering the bottom of said tower for passing a heated solvent for uranium thereto, a tailings receiver at the bottom of said tower, a heating jacket surrounding said tower, an overflow weir for fluid located at the top of said tower, a nozzle chamber, a line for passing liquid from said overflow weir to said nozzle chamber, a first storage tank for acid, a line connected to said first storage tank for passing acid to liquid passing from said overflow weir to said nozzle chamber, a gas-liquid separator, a line connected between said nozzle chamber and said gas-liquid separator, a settling tank, a line connected between said gas-liquid separator and said settling tank, a second storage tank for alkalizing solution, a line connected to said second storage tank for passing alkalizing solution to said settling tank, a filter for precipitated uranium compound, a line connected between said settling tank and said filter, a third storage tank, a line connected between said third storage tank and said filter, a line connected between said third storage tank and said tailings receiver, means for removing tailings from said tailings receiver, a separator for separating tailings and liquid, and a line connected between said separator and said third storage tank for passing liquid from said separator to said third storage tank.

4. A system for the treatment of uranium bearing ore to remove and recover uranium values therefrom comprising an extraction tower, a plurality of rotatable stirring arms each curved to present a convex surface in the direction of their travel and located interiorly of said extraction tower at the upper portion thereof, a plurality of rotatable stirring arms each curved to present a concave surface in the direction of their travel and located interiorly of said extraction tower at the lower portion thereof, means located at the top of said tower for passing uranium bearing ore into said tower, a line entering the bottom of said tower for passing a heated solvent for uranium thereto, a tailings receiver at the bottom of said tower, a heating jacket surrounding said tower, an overflow weir for fluid located at the top of said tower, a nozzle chamber, a line for passing liquid from said overflow weir to said nozzle chamber, a first storage tank for acid, a line connected to said first storage tank for passing acid to liquid passing from said overflow weir to said nozzle chamber, a gas-liquid separator, a line connected between said nozzle chamber and said gas-liquid separator, a settling tank, a line connected between said gas-liquid separator and said settling tank, a second storage tank for alkalizing solution, a line connected to said second storage tank for passing alkalizing solution to said settling tank, a filter for precipitated uranium compound, a line connected between said settling tank and said filter, a third storage tank, a line connected between said third storage tank and said filter, a line connected between said third storage tank and said tailings receiver, means for removing tailings from said tailings receiver, a separator for separating tailings and liquid, and a line connected between said separator and said third storage tank for passing liquid from the separator to said third storage tank.

5. A system for the treatment of uranium bearing ore to remove and recover uranium values therefrom comprising an extraction tower, a plurality of rotatable stirring arms each curved to present a convex surface in the direction of their travel and located interiorly of said extraction tower at the upper portion thereof, a plurality of rotatable stirring arms each curved to present a concave surface in the direction of their travel and located interiorly of said extraction tower at the lower portion thereof, means for rotating said stirring arms, means located at the top of said tower for passing uranium bearing ore into said tower, a line entering the bottom of said tower for passing a heated solvent for uranium thereto, a tailings receiver at the bottom of said tower, a heating jacket surrounding said tower, an overflow weir for fluid located at the top of said tower, a nozzle chamber, a line for passing liquid from said overflow weir to said nozzle chamber, a first storage tank for acid, a line connected to said first storage tank for passing acid to liquid passing from said overflow weir to said nozzle chamber, a gas-liquid separator, a line connected between said nozzle chamber and said gas-liquid separator, a settling tank, a line connected between said gas-liquid separator and said settling tank, a second storage tank for alkalizing solution, a line connected to said second storage tank for passing alkalizing solution to said settling tank, a filter for precipitated uranium compound, a line connected between said settling tank and said filter, a third storage tank, a line connected between said third storage tank and said filter, a line connected between said third storage tank and said tailings receiver, means for removing tailings from said tailings receiver, a separator for separating tailings and liquid, and a line connected between said separator and said third storage tank for passing liquid from the separator to said third storage tank.

6. A system for the treatment of uranium bearing ore to remove and recover uranium values therefrom comprising an extraction tower, means located at the top of said tower for passing uranium bearing ore into said tower, a line entering the bottom of said tower for passing a heated solvent for uranium thereto, a tailings receiver at the bottom of said tower, a heating jacket surrounding said tower, an overflow weir for fluid located at the top of said tower, a nozzle chamber, a line for passing liquid from said overflow weir to said nozzle chamber, a first storage tank for acid, a line connected to said first storage tank for passing acid to liquid passing from said overflow weir to said nozzle chamber, a gas-liquid separator, a line connected between said nozzle chamber and said gas-liquid separator, a settling tank, a line connected between said gas-liquid separator and said settling tank, a second storage tank for alkalizing solution, a line connected to said second storage tank for passing alkalizing solution to said settling tank, a third storage tank for calcium chloride solution, a line connected to said third storage tank for passing calcium chloride solution to said settling tank, a filter for precipitated uranium compound, a line connected between said settling tank and said filter, a fourth storage tank, a line connected between said fourth storage tank and said filter, a line connected between said fourth storage tank and said tailings receiver, means for removing tailings from said tailings receiver, a separator for separating tailings and liquid, and a line connected between said separator and said fourth storage tank for passing liquid from said separator to said fourth storage tank.

References Cited in the file of this patent

UNITED STATES PATENTS

| | | |
|---|---|---|
| 2,081,720 | Van Dijck | May 25, 1937 |
| 2,597,504 | Larsson | May 20, 1952 |

FOREIGN PATENTS

| | | |
|---|---|---|
| 304,802 | Germany | Apr. 5, 1918 |
| 651,795 | Germany | Oct. 20, 1937 |